May 8, 1928.
W. T. MARTERSTECK
FLYING SHEAR
Filed June 2, 1927
1,668,777
9 Sheets-Sheet 9
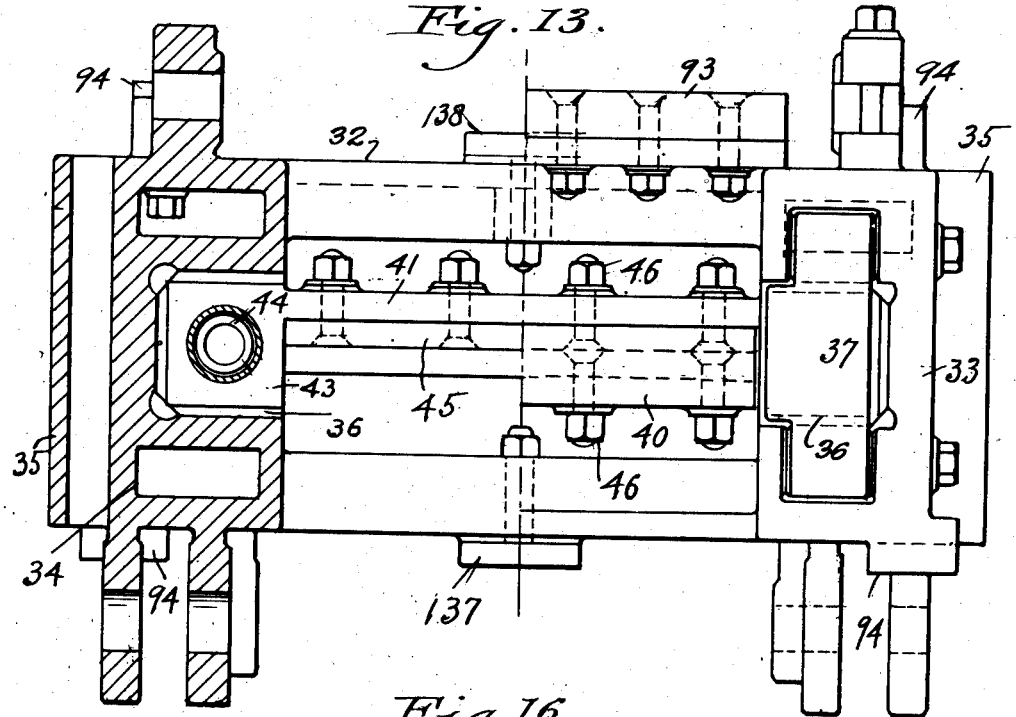
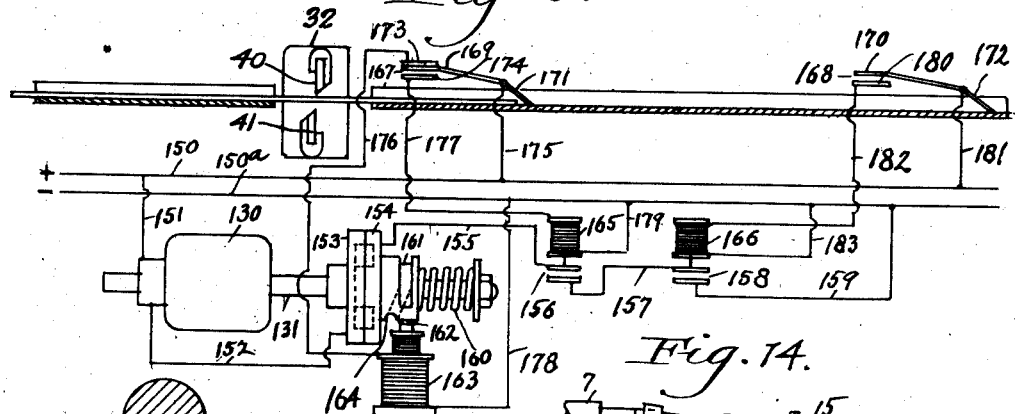
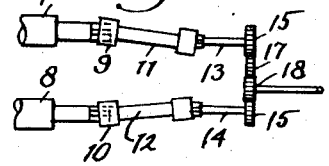
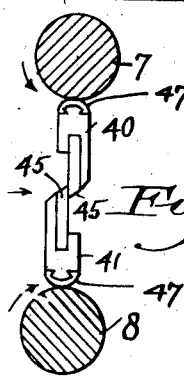
Inventor
William T. Martersteck
By Kwon Hudson & Kent
Attorneys Patented May 8, 1928.

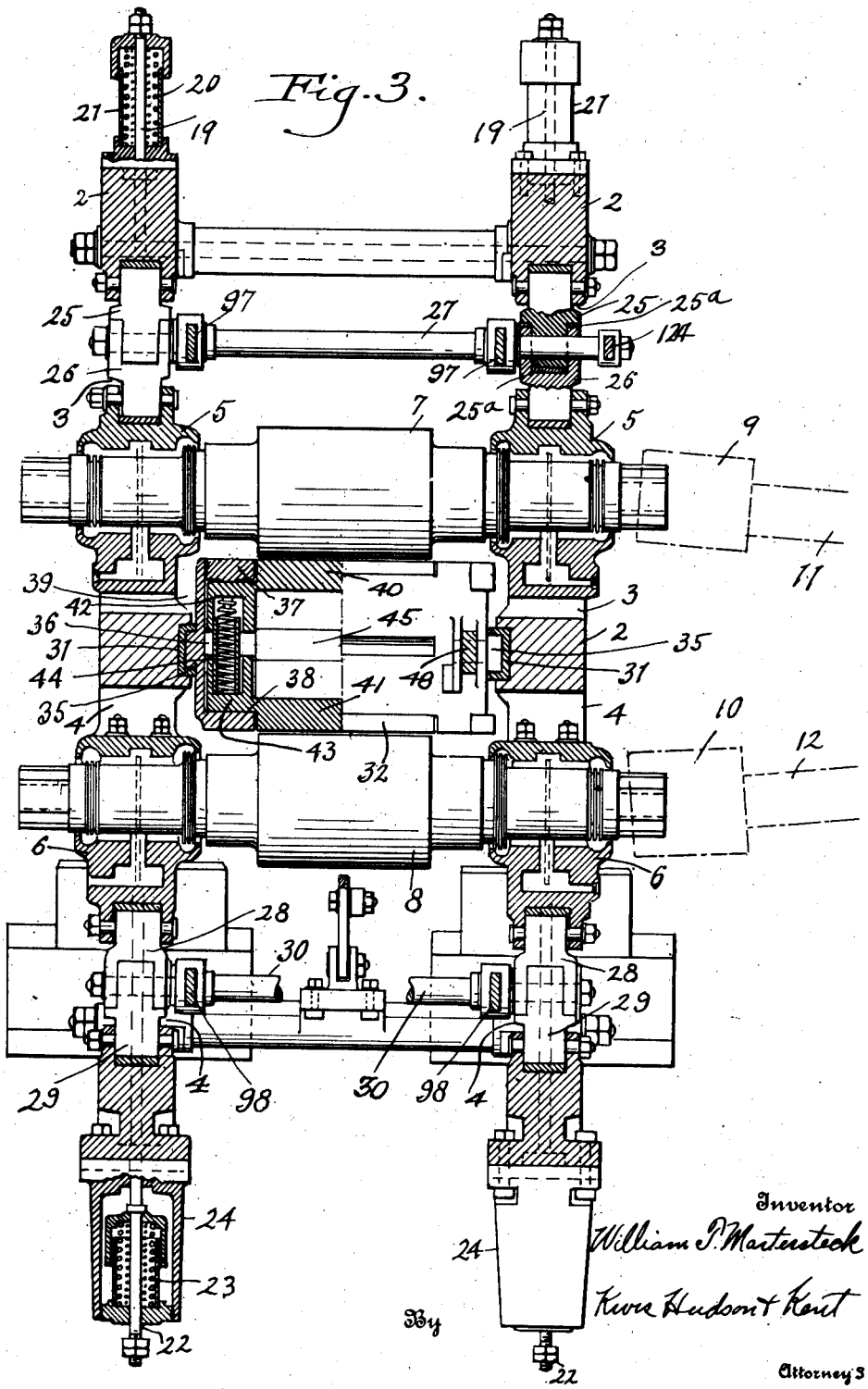

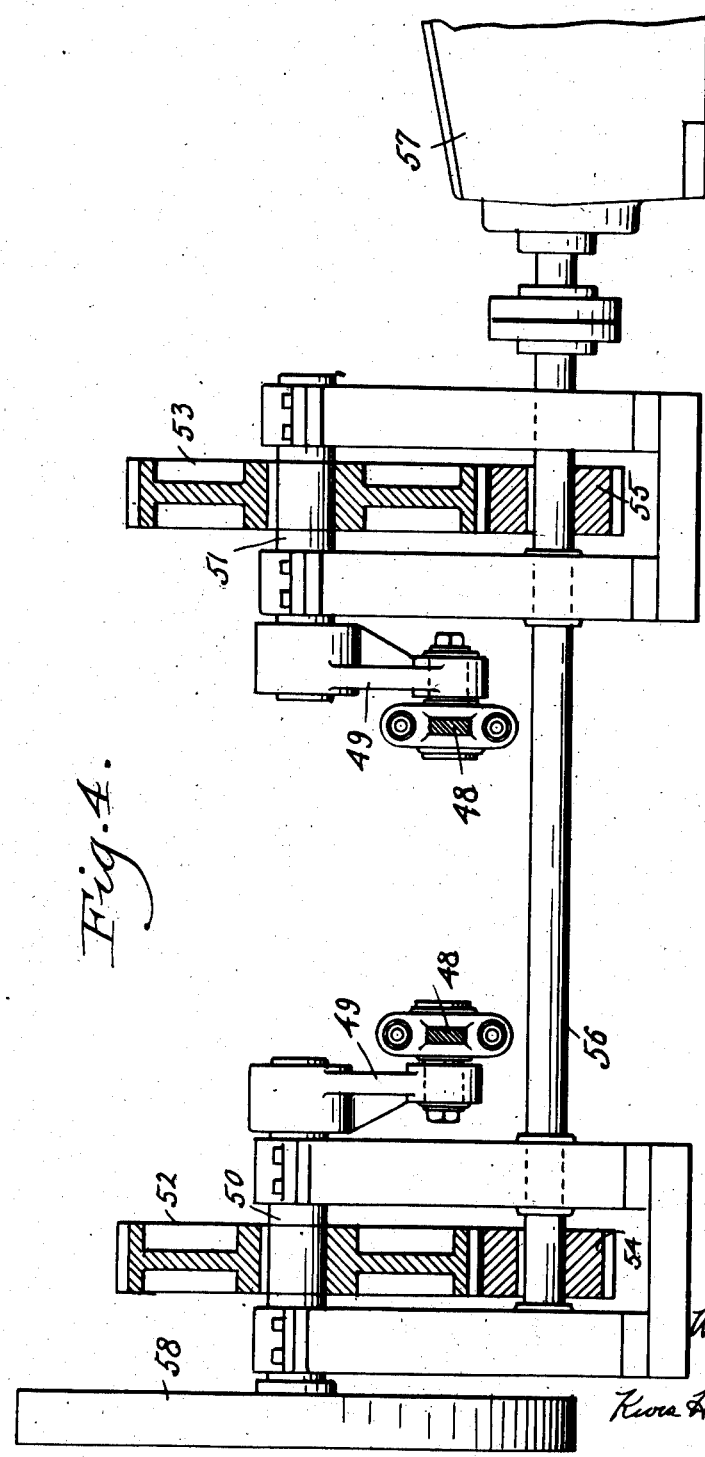

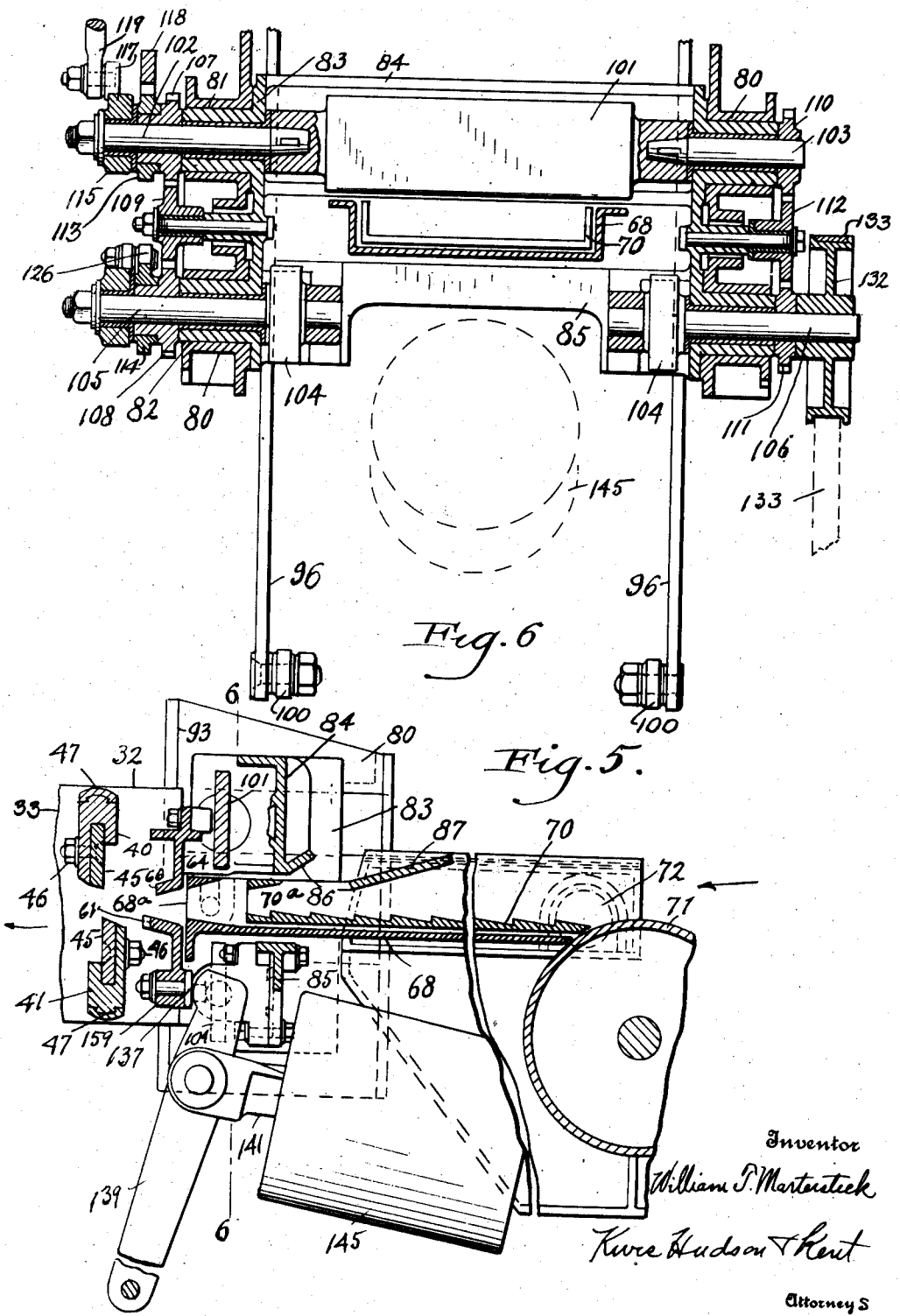

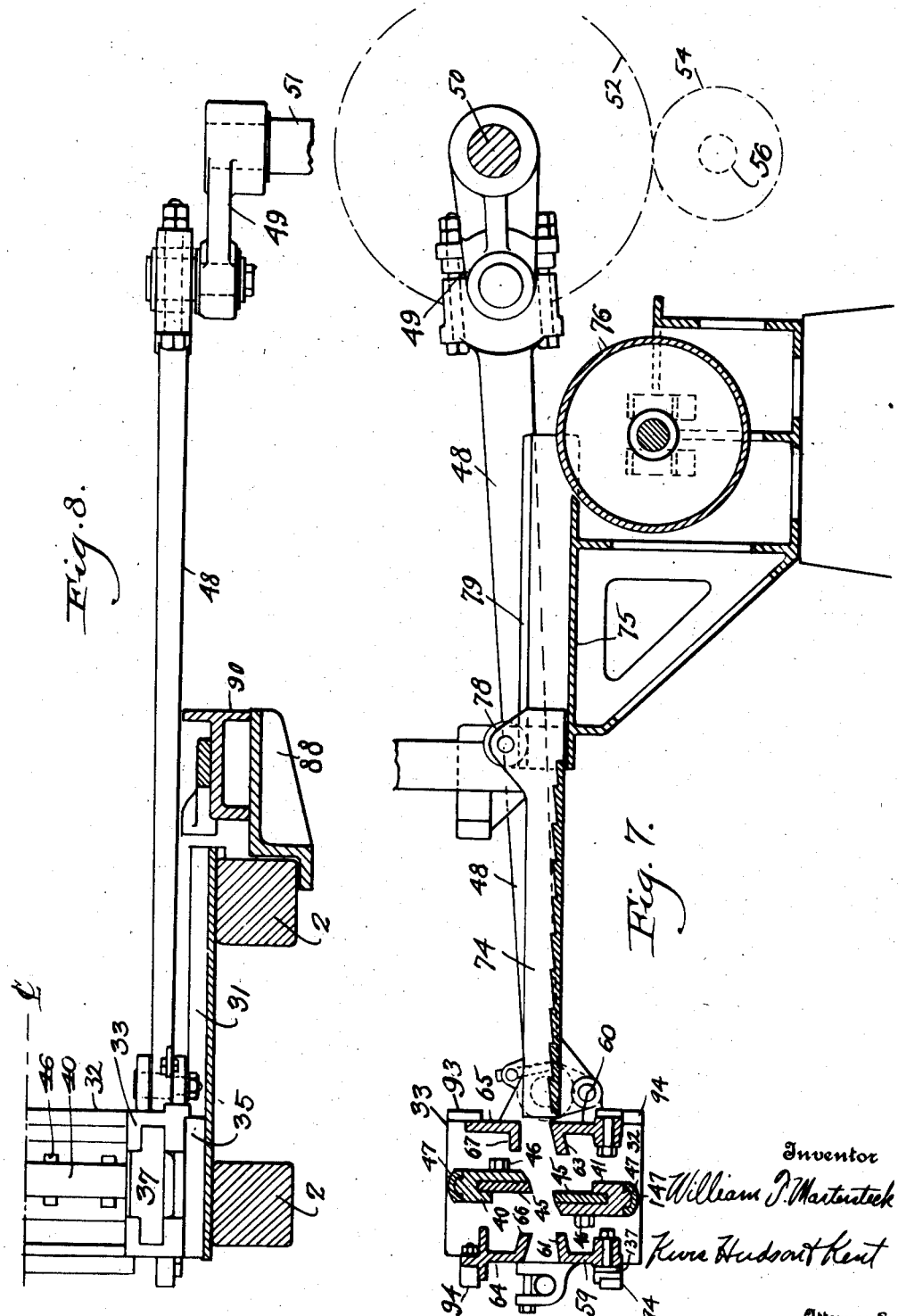

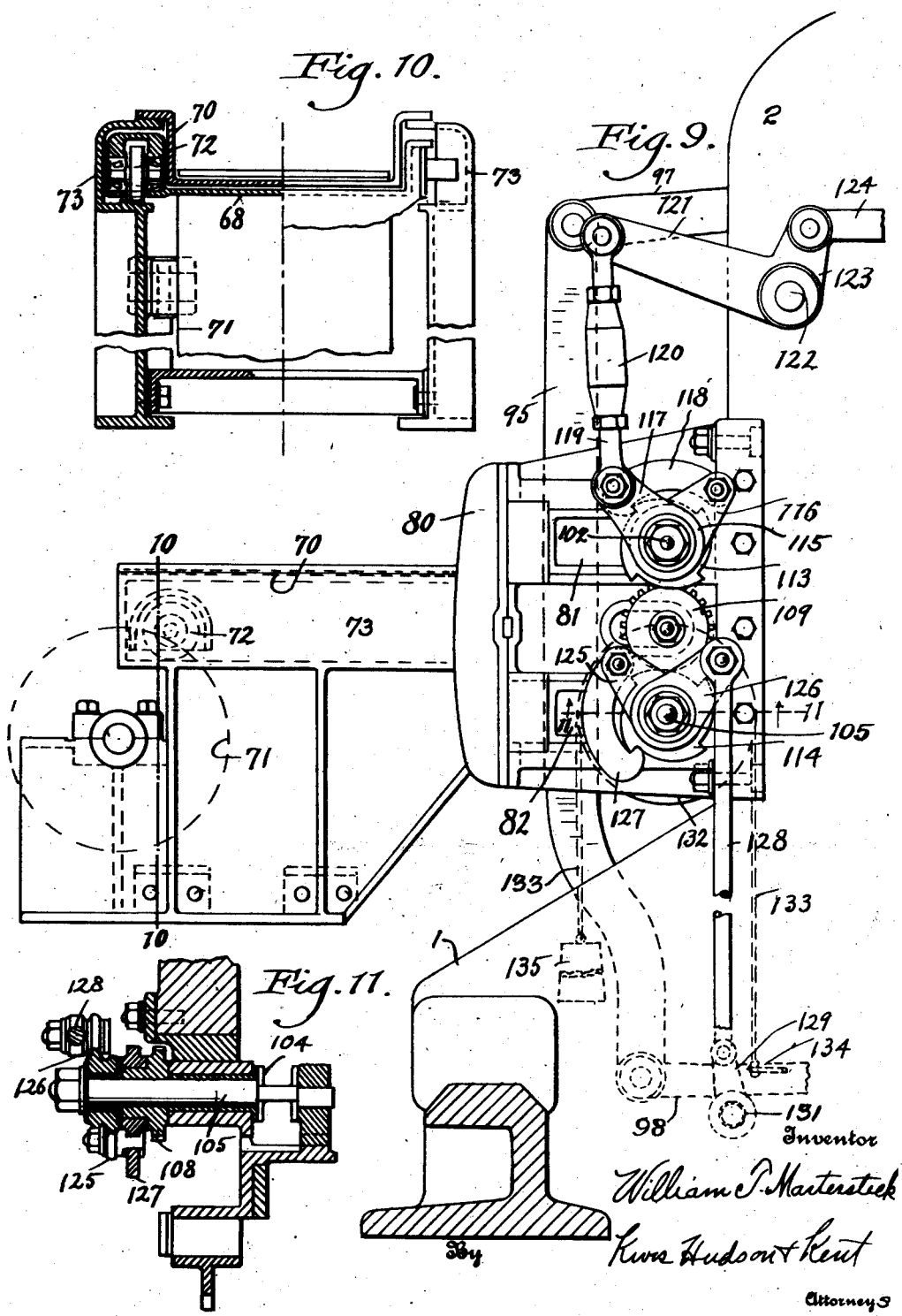

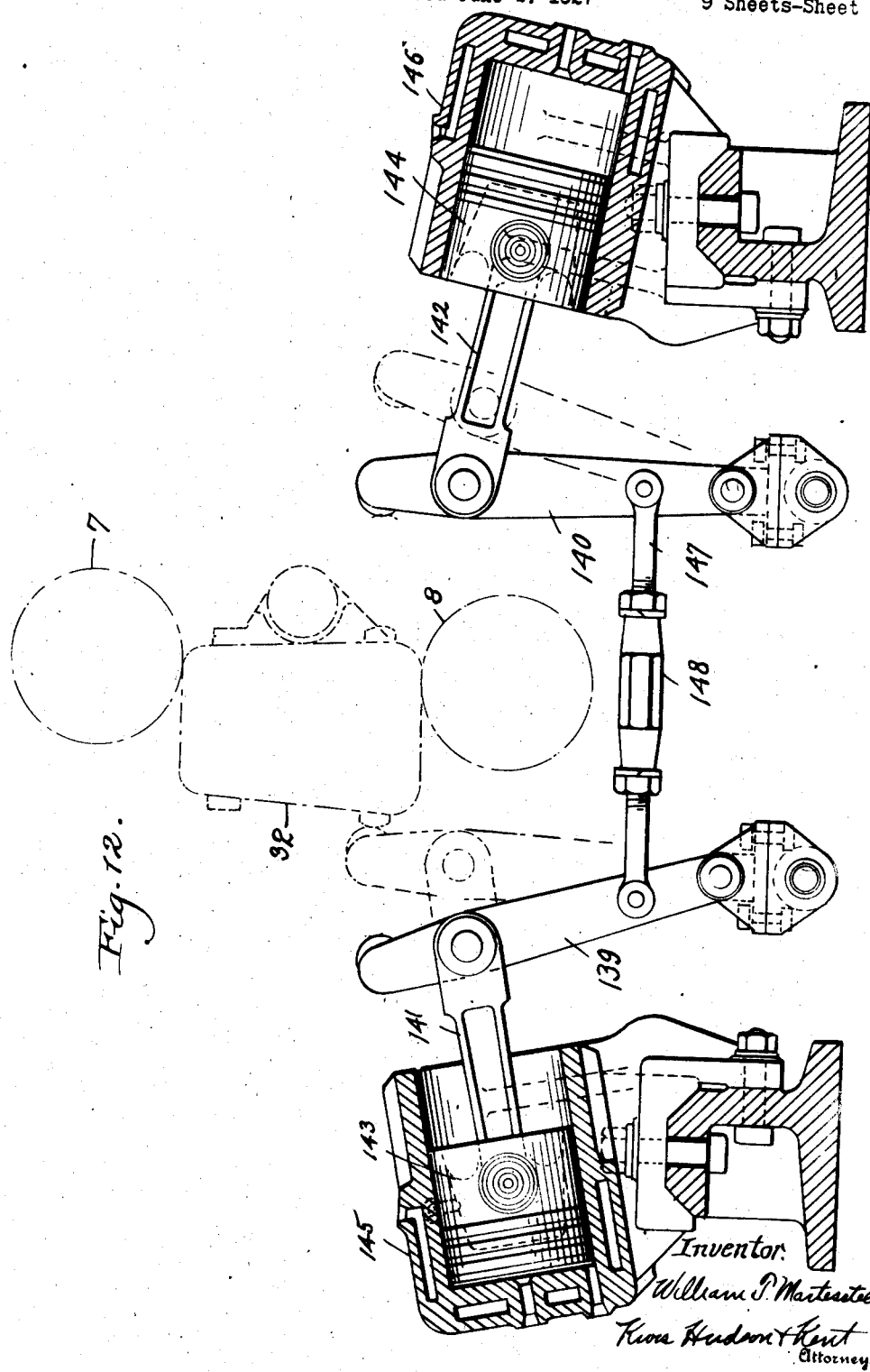

1,668,777

UNITED STATES PATENT OFFICE.

WILLIAM T. MARTERSTECK, OF JACKSON, MICHIGAN, ASSIGNOR TO THE WELLMAN-SEAVER-MORGAN COMPANY, OF CLEVELAND, OHIO, A CORPORATION OF OHIO.

FLYING SHEAR.

Application filed June 2, 1927. Serial No. 196,128.

This invention relates to flying shears for cutting strip stock while it is being delivered from a rolling mill into such lengths as may be desired.

Among the most important objects of the present invention is the provision of a flying shear which operates smoothly with a minimum strain on the operating mechanism, which requires a minimum amount of power to operate, and in which the shear knives and other moving parts of the mechanism are subjected to a minimum wearing action.

A further object is to provide a flying shear having a reciprocating knife carrying head, a knife operating mechanism adapted in one position to operate the shear knives and in another position to clear the shear knives, and means controlled by the shear head in its movement for automatically resetting the knife operating mechanism after each actuation of the shear.

A further object is to provide means for guiding the strip material through the reciprocating shear head for preventing the material from sagging during its passage through the shear and for maintaining the strip in proper alignment.

A further object is to utilize power driven rolls for operating the shear knives whereby the shear head reciprocating mechanism is largely relieved of the strain incident to the actuation of the knives and the wear on the knife carriers is reduced to a minimum.

A further object is to provide pneumatic cylinders for cushioning the shear block at the ends of its stroke and for applying the energy stored up in the cushioning cylinders while the momentum of the head is being absorbed to assist the starting of the head in the reverse direction.

With the above and other objects in view, the invention may be said to comprise the mechanism as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which:

Fig. 3 is a central transverse vertical section;

Fig. 4 is a transverse vertical section on the line indicated at 4—4 in Fig. 1;

Fig. 5 is a detail view showing the side of the machine into which the material is fed in central vertical section;

Fig. 6 is a vertical transverse section taken on the line indicated at 6—6 in Fig. 5;

Fig. 7 is a central vertical section through the side of the machine from which the material is delivered;

Fig. 8 is a fragmentary horizontal section showing the shear head and one of the connecting rods by which the head is operated;

Fig. 9 is a fragmentary side elevation on an enlarged scale, showing the mechanism at the incoming side of the shear housing for controlling the cam rolls;

Fig. 10 is a vertical section on the line indicated at 10—10 in Fig. 9;

Fig. 11 is a horizontal section on the line indicated at 11—11 in Fig. 9;

Fig. 12 is a central vertical section through the cushioning cylinders associated with the reciprocating shear head;

Fig. 13 is a plan view of the shear head with a portion broken away and shown in horizontal section;

Fig. 14 is a diagrammatic view showing the drive for the cam rolls;

Fig. 15 is a fragmentary view showing the cam rolls engaging the shear knives; and Fig. 16 is a wiring diagram showing the circuit and controlling switches for the distance bar actuating motor.

Figure 1:
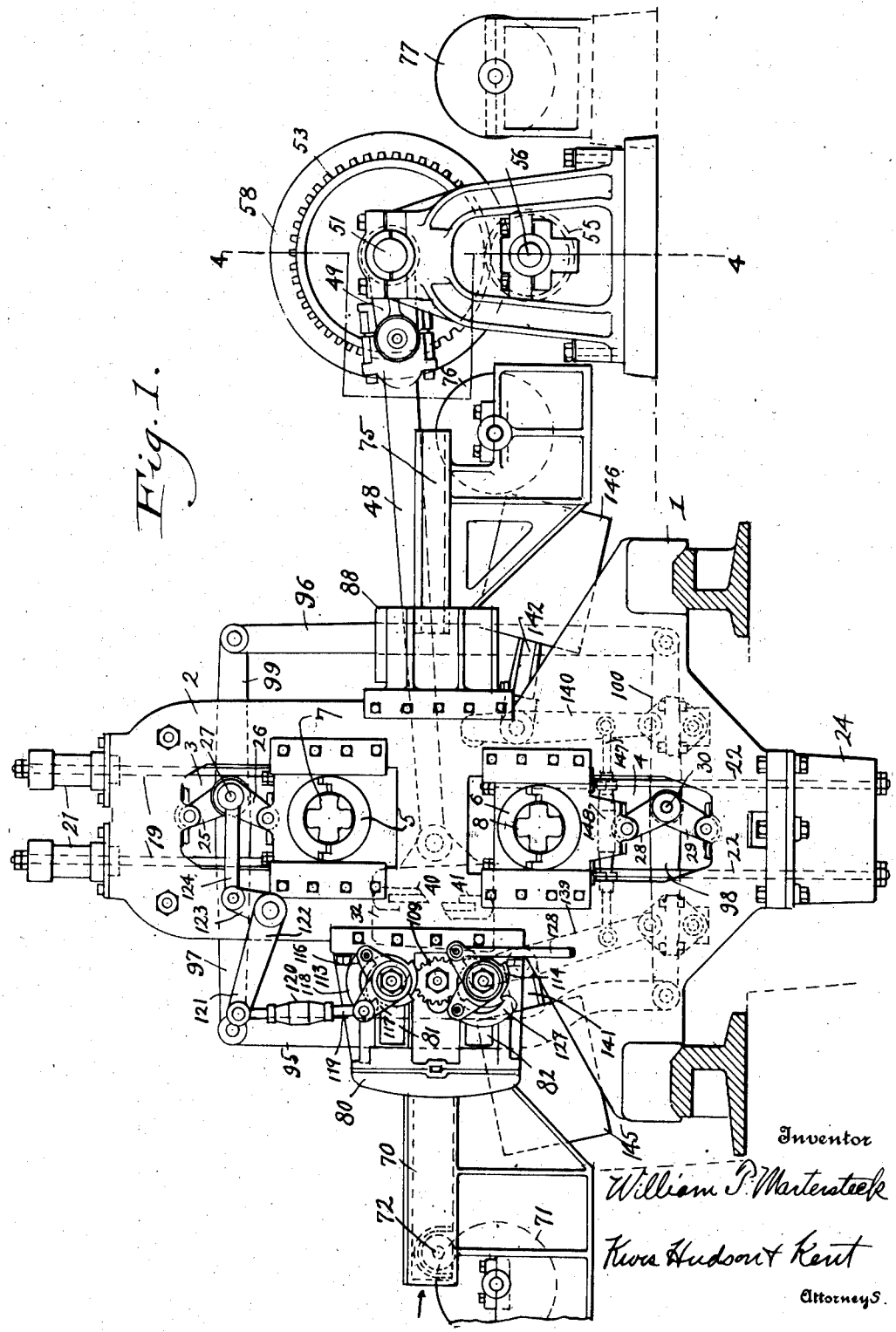
Fig. 1 is a side elevation of the machine.
Figure 2:
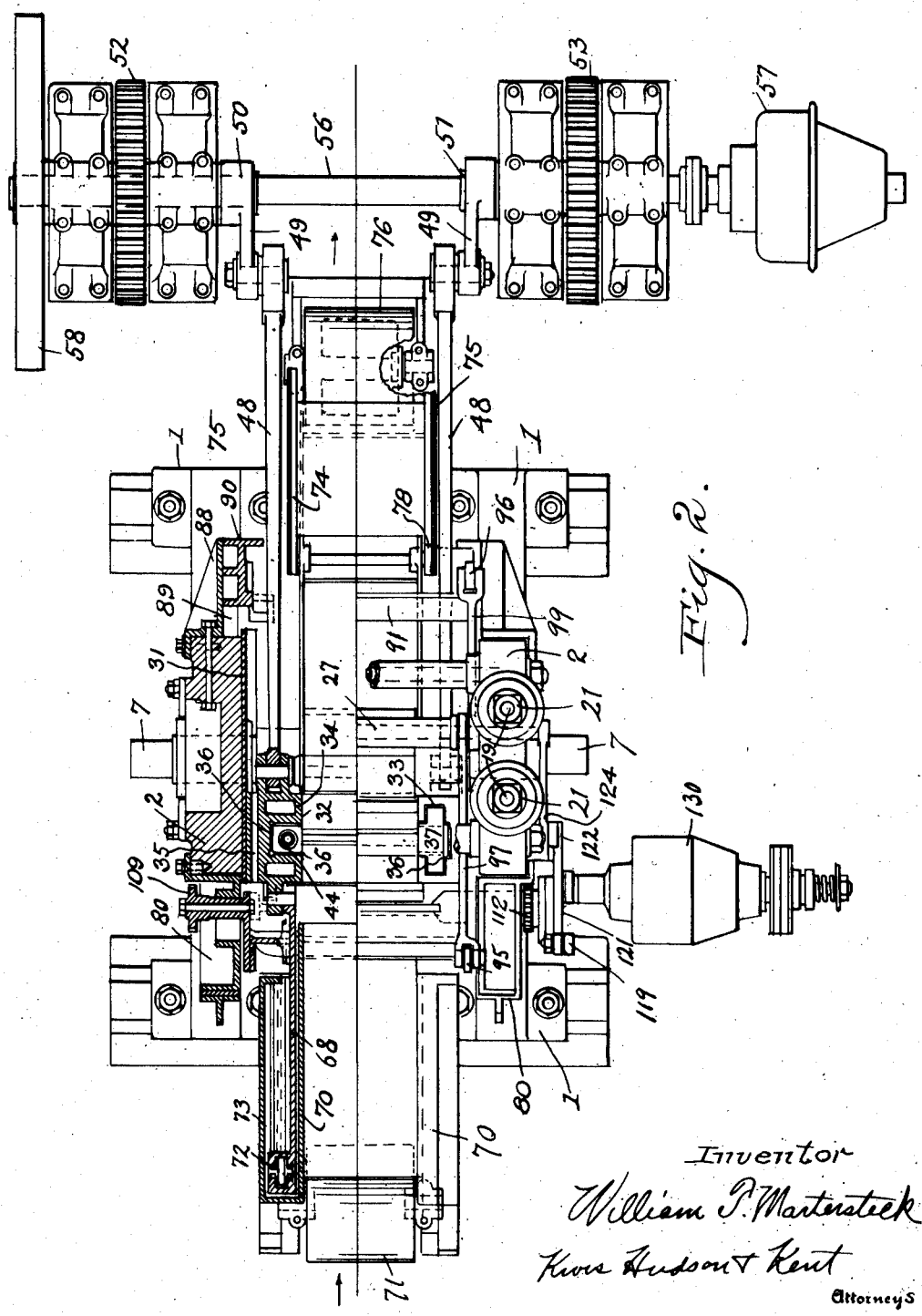
Fig. 2 is a sectional plan view of the machine showing a portion of the housing and of the sliding heads at one side of the machine in horizontal section.

Referring to the accompanying drawings, the strip shearing machine, which forms the subject matter of the present invention is arranged to receive the strip stock as it is delivered from a rolling mill and the strip shearing mechanism is mounted within a fixed housing 1 which has spaced vertical sides 2 between which the strip stock is continuously fed. The sides 2 of the housing are provided with upper and lower housing windows 3 and 4 which are disposed above and below the line of travel of the strip stock, bearing blocks 5 and 6 are mounted for vertical movement in the windows 3 and 4 and in these bearing blocks are journaled rolls 7 and 8 which serve to actuate the shear knives, as will be hereinafter explained, the rolls 7 and 8 being movable toward and from the strip passing between them into and out of positions in which they engage the knife holders. The knife operating rolls are preferably continuously driven by means of driving connections, such as are provided for the upper and lower rolls of a rolling mill. As shown diagrammatically in Figs. 3 and 14 of the drawing, the shoulders of the rolls 7 and 8 projecting through the bearing blocks 5 and 6 may be connected by means of the usual flexible couplings 9 and 10 with swinging shafts 11 and 12 which are connected by flexible couplings with parallel shafts 13 and 14 which are journaled in fixed bearings. The shafts 13 and 14 may be simultaneously driven in opposite directions at equal speeds by means of gears 15 fixed to the shafts 13 and 14 and intermediate gears 17 and 18, one of the gear shafts being a drive shaft.

The upper bearing blocks 5 are suspended from the top of the frame by means of suspension rods 19 which are supported at their upper ends upon compression springs 20 mounted in casings 21 at the top of the frame, as shown in Fig. 3. The lower bearing blocks 6 are supported at the upper ends of the vertical rods 22 which are supported at their lower ends by compression springs 23 in casings 24 secured to the frame at the bottom thereof. The compression springs 20 serve to normally support the upper roll 7 in its uppermost or inoperative position and the lower springs 23 serve to partially counter-balance the lower roll 8 which is normally held by gravity in its lowermost or inoperative position. The upper roll 7 is adapted to be actuated in opposition to the compression springs 20 by means of toggle links 25 and 26 which are pivoted respectively to the upper ends of the blocks and to the housing at the upper ends of the windows 3, the links 25 and 26 being pivotally connected by means of a cross shaft 27. The lower roll 8 is adapted to be lifted by means of toggle links 28 and 29 which are pivoted respectively to the lower ends of the bearing blocks 6 and to the housing at the lower ends of the windows 4, the toggle links 28 and 29 being pivotally connected by means of a cross shaft 30. It will be obvious that when the toggle links 25 and 26 and 28 and 29 are straightened by moving their pivots 27 and 30 to the left, as shown in Fig. 1, the rolls 7 and 8 will be moved toward the line of travel of a strip passing through the machine. As shown in Fig. 3 the toggle links have interfitting knuckles provided with rounded bearing portions between which are interposed brasses 25ª, the weight of the rolls being imposed upon the bearings between the links instead of upon the pivot shafts.

The sides 2 of the housing are provided on the inner sides thereof with horizontal guide channels 31 and a reciprocable shear head 32 is mounted for horizontal travel between the plates. The shear head 32 has end members 33 and 34 which are provided with shoulders 35 which have a sliding fit in the guide channels 31. The end members 33 and 34 are provided with vertical channels 36 upon the inner sides thereof which are closed at their upper ends by yokes 37 and at their lower ends by an integral flange 38. The channels 36 are adapted to receive vertically movable knife holders 40 and 41, the holder 40 having extensions 42 engaging in the upper portions of the channels 36, and the holder 41 having extensions 43 projecting into the lower portions of the channels 36. The extensions 42 and 43 are normally held against the yokes 37 and the flanges 38, respectively, by means of compression coil springs 44 which are interposed between the extensions within the channels 36. Hardened steel shear knives 45 are attached to the holders 40 and 41 by means of bolts 46 and these knives are arranged one in advance of the other so that when the holders are forced toward each other the knives 45 pass one over the face of the other with a shearing action. The holders 40 and 41 are provided upon the upper and lower edges, respectively, thereof with rounded hardened steel wear plates 47 which engage with the rolls 7 and 8 when the rolls are in position to actuate the knives.

During the operation of the machine the shear head 32 is continually reciprocated by means of connecting rods 48 which are pivoted to the shear head at the side thereof from which the material is delivered, and to cranks 49 fixed to coaxial horizontal shafts 50 and 51 upon opposite sides of the machine. The shafts 50 and 51 have fixed thereto gears 52 and 53 that mesh with small gears 54 and 55 on shaft 56 extending beneath and parallel to the shafts 50 and 51, shaft 56 being driven at suitable speed by means of an electric motor 57. In order to relieve the motor 57 of sudden changes in load, a fly wheel 58 may be mounted upon the shaft 50 and this fly wheel, by its momentum, serves to prevent sudden increases in the torque of the motor shaft.

As shown in Figs. 5 and 7 of the drawings, the end members 33 and 34 of the shear head are connected upon opposite sides of the lower knife carrier by cross bars 59 and 60 which may be cast integrally with the end members, and these cross bars are provided at their upper edges with inturned guide flanges 61 and 63, the flanges 61 at the incoming side being inclined upwardly towards its inner edge and the flange 63 being inclined downwardly towards its inner edge, the flange 61 serving to guide the strip between the knives, and the flange 63 serving to guide the strip at the outgoing side of the head. The head 32 is also provided with upper front and rear cross bars 64 and 65 which may be cast integrally with the end members and these cross bars are provided at their lower edges with inturned guide flanges 66 and 67, the flange 66 being adapted to prevent the end of the strip from engaging the upper knife as the strip enters the shear head.

During the operation of the machine the shear head 32 is continuously reciprocated in the guide channels 31 and the strip stock is continuously fed through the head between the knives 45. It will be apparent that if the rolls 7 and 8 are positioned in their lowermost and uppermost positions respectively, the curved edges of the holders 40 and 41 will engage the rolls as the head passes between the rolls and the knives will be pressed together to shear the stock.

Since the strip stock as it is fed from the rolling mill is still hot, it is important that means be provided for so supporting the strip as it is fed through the shearing machine that the strip is not permitted to bend or sag, otherwise the pieces delivered from the shear would not be straight.

As best shown in Fig. 5 of the drawing, the trough 68 is pivoted to the head 32 on the incoming side thereof and is slidably mounted in a fixed trough 70 which has a serrated bottom and is mounted on a support which carries a feed roller 71 over which the strip stock is fed to the shearing machine, the trough 68 being supported by means of supporting wheels 72 which travel in the guide channels 73 at the sides of the fixed trough. The trough 68 is of a length such that it bridges the space between the fixed trough 70 and the head 32 in all positions of the head. At their delivery ends the troughs 69 and 70 have tapering openings 68ª and 70ª through which the strip is guided into the shear head.

As best shown in Fig. 7 of the drawing, a trough 74, similar to the trough 68, is pivoted to the outgoing side of the head 32 and slides in a fixed trough 75 which extends to a feedout roll 76, the trough 74 being of a length to bridge the space between the head 32 and the trough 75 in all positions of the reciprocating head so that the strip is supported throughout the space between the reciprocating head and the feedout roll. A second feedout roll 77 may be provided beyond the roll 76, and the feedout rolls and also the feed roll 71 are continuously driven at speeds suitable for feeding and delivering the strip material, these rolls being preferably driven in synchronism with the rolls of the mill from which the strip stock is delivered, with the knife operating rolls and with the shear head actuating mechanism, the driving motors operating in synchronism. The trough 74 is supported on the fixed trough 75 by means of supporting wheels 78 which travel in guide channels 79 at the opposite sides of the trough 75.

Rigidly secured to the main housing at the incoming side thereof there is a housing 80 which has opposite side walls forming extensions of the sides 2 of the main housing and provided with upper and lower horizontal guide slots 81 and 82 which form supports for a movable cross head 83 which has upper and lower cross bars 84 and 85 above and below the guide trough 68 which extends through the cross head. The upper bar 84 has an outwardly projecting upwardly inclined guide flange 86 which serves to deflect an upwardly curled end of a strip into the opening 70ª of the trough 70. The guide trough 68 may also be provided with an inclined guide plate 87 which serves to guide the forward end of a strip toward the opening.

At the outgoing side of the main housing, directly opposite the housing 80, there is rigidly attached a second auxiliary housing 88 which has side walls forming extensions of the sides 2 of the main housing, these side walls being provided on their inner sides with horizontal guide channels 89 which support a sliding cross head 90. The cross head 90 has a top cross bar 91 which is positioned above the delivery trough 74 and clear of the connecting rods 48. The shear head 32 is provided on opposite sides thereof with a bumper bar 93 secured along the upper edge of the bar 65 and with bumper blocks 94 projecting from the lower bars 59 and 60 and upper bar 64 adjacent the ends thereof, said bumper bars and blocks being adapted to engage parts of the cross heads 83 and 90 to impart movement to these cross heads at the opposite ends of the stroke of the head for the purpose of shifting the roll toggles to move the rolls into and out of knife actuating position. For actuating the toggles, the head 83 carries a vertical bar 95, the upper end of which is at substantially the level of the pivot shaft 27 of the upper toggle and the lower end of which is at substantially the level of the pivot shaft 30 of the lower toggle. The cross head 90 carries a vertical bar 96 which corresponds substantially to the bar 95 carried by the cross head 83. The upper and lower ends of the vertical bar 95 are connected to the toggle shafts 27 and 30 by means of links 97 and 98 and the upper and lower ends of the vertical bar 96 are connected to the toggle shafts by means of links 99 and 100.

The shear head 32 has a stroke of sufficient length to impart the necessary actuation to the cross heads 83 and 90 at the ends of its stroke. When the head 32 actuates the cross head 83 to the left, as shown in Fig. 1, pivot shafts 27 and 30 of the toggles are moved by the head to dead center or slightly past dead center position, the straightening of toggles moving the upper roll to its lowermost position and the lower roll in its uppermost position. Upon the return stroke of the shear head 32 and while the head is moving in the same direction and at substantially the same speed as the strip passing through the machine, the edges of the knife holders 40 and 41 engage with the rotating rolls 7 and 8 and are forced toward each other as they pass between the rolls to shear the strip. The direction of rotation of the lower roll, as viewed in Fig. 1, is clockwise and the direction of rotation of the upper roll is counterclockwise so that when the knife holders are brought into engagement with the rolls they are positively fed by the rotating rolls so that very little strain is put upon the operating mechanism by the passage of the shear knives between the rolls.

After the shear head has passed between the rolls, it strikes against the cross head 90 which has been pulled to the left, as viewed in Fig. 1, by the actuation of the toggle links, and engagement of the shear head with the cross head 90 moves the cross head 90 to the right, as viewed in Fig. 1, shifting the toggle pivots 27 and 30 to the right and returning the rolls to their inoperative positions, so that they are clear of the shear head 32 during the return travel thereof.

Assuming that the heads 83 and 90 are actuated upon each reciprocation of the shear head 32, the strip would be cut upon each reciprocation of the head. In some instances, however, it is desirable to cut the strip into longer lengths and to enable this to be done means is provided whereby the shear head may reciprocate between the cross heads 83 and 90 when the rolls are in inactive position without actuating the cross heads, together with manually or automatically operable means by which the shear head is caused to actuate the cross head 83 to straighten the roll actuating toggles and cause actuation of the knives at desired intervals. When the rolls 7 and 8 are in their inoperative positions, the cross head 90 is positioned just beyond the forward limit of movement of the shear head 32, and in order to permit the shear head to reciprocate between the heads 83 and 90 without actuating the cross heads, the abutments 93 and 94 of the shear head engage with members 101 and 104 on the cross head 83 which may be adjusted from a position in which they clear the shear head 32 at the end of its rearward stroke to a position in which they project inwardly in the path of the abutments 93.

In the first position of the adjustable members the cross head 83 is not actuated by the shear head, and in the second position the cross head 83 is moved a distance corresponding to the distance which the members overlap the stroke of the shear head. As shown herein, the abutment members are in the form of upper and lower distance bars movably mounted on the cross head 83 in line with the upper and lower abutments 93, the upper distance bar 101 being a flat elongated bar having a width several times its thickness and attached at its ends to horizontal stub shafts 102 and 103 journaled in the end plates of the cross head 83. Lower distance bars 104, which are short bars mounted adjacent the opposite sides of the housing 80, correspond in width and thickness to the upper distance bar 101 and are attached to axially aligned stub shafts 105 and 106 journaled in the end plates of the head 83 directly below the upper distance bar 101, the upper distance bar 101 extending across the space between the end plates of the cross head, whereas the lower distance bars 104 are short bars in line with the lower abutments 93 of the shear head.

In order to obtain simultaneous actuation of the upper and lower distance bars 101 and 104, the stub shafts 102 and 105 have fixed thereto gears 107 and 108 which mesh with an intermediate idler 109. Likewise the shafts 103 and 106 have fixed thereto gears 110 and 111 which mesh with an intermediate idler 112. In order to hold the distance bars in their vertical and horizontal positions, gears 107 and 108 have fixed thereto ratchets 113 and 114 which are preferably each provided with four teeth spaced 90° apart. Loosely mounted upon the outer end of the shaft 102 there is a collar 115 which is provided with arms 116 and 117, a pawl 118 is pivoted to the outer end of the arm 116 and engages with the ratchet 113. The outer end of the arm 117 is connected to a link 119 which may be adjusted as to length by means of a turnbuckle 120 and which is connected at its upper end to an arm 121 of a bell crank lever 122 pivoted upon the outside of the main housing. The second arm 123 of the bell crank 122 is connected to the projecting end of the toggle pivot shaft 27 by a link 124.

Assuming that the distance bars 101 and 104 have been adjusted to horizontal position they will be engaged by the shear head 32 on its rearward stroke and the cross head 83 will be moved a distance corresponding to the distance which the bars 101 and 104 overlap the stroke of the head 32, when in their horizontal position, causing the roll actuating toggles to be straightened and the rolls to be moved into knife actuating position. The movement of the cross head 83 causes a corresponding movement in the same direction of the cross head 90 so that the cross head 90 is moved to a position overlapping the stroke of the shear head 32. When the shear head 32 reaches the forward end of its stroke the abutments 94 strike the head 90 shifting the toggle pivots and return the rolls to their inoperative positions. The movement of the head 83 and the corresponding movement of the toggle links 25 and 26 causes the bell crank 122 to be rocked in a direction to move the arm 121 downwardly turning the collar 115 in a counter-clockwise direction, as viewed in Fig. 1. This movement of the collar 115 is substantially 90 degrees and causes the pawl 118 to be advanced one tooth of the ratchet 113. When the roll actuating toggles are moved in the opposite direction by engagement of the shear head 32 with the cross head 90, the bell crank 122 is rocked in the opposite direction raising the arm 121 and turning the ratchet 113 90 degrees. The ratchet being connected to the shaft of the upper distance bars and the lower distance bars being geared to the upper distance bar, this movement of the ratchet turns the bars 90 degrees from their horizontal to their vertical position in which they are clear of the reciprocating shear head. Thus the distance bars are automatically returned to their inoperative position after each actuation of the shear knives, and in order to actuate the shear knives, manually or automatically controlled means is provided for moving the distance bars 101 and 104 to their horizontal interfering position.

The shaft 105 has at its outer end a collar provided with radially extending arms 125 and 126, the arm 125 having pivoted to its outer end a gravity pawl 127 that engages with the ratchet 114 and the arm 126 having connected to its outer end an actuating rod 128 which may be connected to a suitable crank arm 129 which may be operated manually or which may be turned one revolution by means of an electric motor 130 having its shaft 131 connected to the crank 129 and operated at such intervals and so controlled that the distance bars are operated in the desired timed relation with respect to the movements of the reciprocating shear head, as will be hereinafter more fully explained.

The distance bars 101 and 104 are moved to operative or head engaging position by actuation of the lower ratchets 114 and are automatically returned to inoperative position by means of the upper ratchets 113 after actuation of the shear knives. The pawls normally serve to prevent turning movement of the distance bars in one direction but it is desirable that means also be provided to prevent accidental displacement of the bars by turning movements in the direction in which they are turned by the pawls or in the opposite direction if both pawls happen to be disengaged at the same time so that the bars will not have any movement other than that imparted to them by the ratchets. To this end the shaft 106 is provided with a brake pulley 132 over which extends a brake band 133 anchored at one end to the frame, as indicated at 134 in Fig. 9, and having a weight 135 at its opposite end. Turning of the shaft 106 in the direction in which it is actuated by either of the pawls tends to lift the weight 135 and loosen the band, whereas rotation in the opposite direction tends to tighten the band. The brake offers sufficient resistance to turning movement to prevent the ratchets from overrunning the pawls and provides a lock against turning movement in the direction opposite that in which the ratchets are moved by the pawls so that there is no danger of the distance bars being moved in either direction except by the action of the pawls.

The reciprocating shear head 32 is provided on opposite sides adjacent the bottom with centrally disposed abutments 137 and 138 which engage with levers 139 and 140 pivoted at their lower ends to the base of the frame and pivotally connected adjacent their upper ends with piston rods 141 and 142 which are connected to pistons 143 and 144 which operate in pneumatic cushioning cylinders 145 and 146, the levers 139 and 140 being connected by an extensible link 147 provided with a turnbuckle 148 so that the levers are caused to move simultaneously. The levers 139 and 140 are so positioned that they are engaged by the shear head 32 as the shear head approaches the opposite ends of its stroke and the movement of each of these levers when it is engaged by the shear head moves the piston of the adjacent cushioning cylinder inwardly compressing the air behind the cylinder and gradually absorbing the momentum of the shear head. When the shear head reaches the end of its stroke, the pressure in the adjacent cushioning cylinder is at a maximum and this pressure is exerted upon the shear head to overcome its inertia and assist the actuating mechanism in reversing the direction of movement of the shear head.

The operation of the motor 130 is preferably controlled automatically so that the distance bars are moved to operative positions at regular intervals which may be varied to vary the length of the pieces into which the strip is cut, the operation of the motor being preferably controlled by switch operating flags in the path of the strip material delivered from the machine. As shown in Fig. 16 of the drawings, the motor 130 receives current from a positive line 150 through a wire 151 and is connected to the negative line 150$^a$ through wire 152, rotary contact members 153 and 154 on the motor shaft 131, wire 155, switch 156, wire 157, switch 158, and wire 159. The contact member 154 is slidably keyed on the shaft 131 and is pressed toward the contact member 153 by a coil spring 160. The member 154 is provided with a circumferential cam groove 161 in which a pin 162 carried by a magnet 163 is adapted to engage, the groove being in a plane perpendicular to the axis of the shaft throughout the major portion of its circumference and having the remaining portion 164 thereof deflected laterally toward the member 154 so that rotation of the shaft will cause the contact member 154 to be forced away from the contact member 153 when the pin 162 enters the deflected portion 164 of the groove.

The normally open switch 156 is adapted to be closed by a magnet 165 and the normally open switch 158 by a magnet 166. The magnets 163, 165 and 166 are controlled by means of switches 167 and 168 mounted on the delivery trough of the machine, the first switch 167 being located as close as possible to the discharge side of the shear housing and the second switch member 168 being spaced outwardly from the switch 167 and adjustable along the delivery trough. The switches 167 and 168 have movable contact members 169 and 170 which are pivoted above the trough and which have downwardly extending arms or flags 171 and 172 projecting down into the path of the strip material passing through the trough. The switch member 167 has upper and lower contacts 173 and 174 between which the contact member 169 moves, the member 169 being normally in engagement with the contact 173 but being moved into engagement with the contact 174 when the flag 171 is engaged and lifted by the strip as it passes beneath the same.

The contact member 169 is connected with the line 150 by a wire 175 and the upper and lower contacts 173 and 174 are connected by wires 176 and 177 to magnets 163 and 165, the magnets 163 and 165 being connected to the line 150ª by wires 178 and 179. The switch 168 has a single stationary contact 180 and its movable contact member 170, which is normally out of engagement with the stationary contact 180, is moved into engagement therewith when the strip engages the flag 172. The movable contact 170 is connected to the line 150 by a wire 181, and the stationary contact 180 is connected to the magnet 166 by a wire 182, the magnet 166 being connected to the line 150ª by wire 183.

Assuming that the machine is being started into operation, flags 171 and 172 will be in their lowermost positions, contact member 169 will engage contact 173, and contact member 170 will be out of engagement with contact 180. Current passing through magnet 163 will hold the pin 162 out of engagement with the rotary contact member 154 which will be held against contact member 153 by the spring 160. No current will be passing through magnets 165 and 166, and switches 156 and 158 will consequently be open. As the strip passes beneath the flag 171, the movable contact member 169 is shifted from the contact 173 to the contact 174, de-energizing the magnet 163, so that the pin 162 is permitted to engage the rotary contact member 154, and energizing the magnet 165, so that the switch 156 is closed. When the strip reaches the flag 172, switch 168 is closed and magnet 166 is energized, closing switch 158 and completing the motor circuit. Upon rotation of the contact member 154, the pin 162 enters the straight portion of the groove 161, and when a revolution is nearly completed, the laterally deflected portion of the groove coacts with the pin to cam the contact member 154 out of engagement with the contact member 153, breaking the motor circuit and stopping the motor. The throw of the crank 129 is such that in a complete revolution it first swings the pawl arm 126 through 90° to impart a quarter turn to the distance bars 101 and 104, and then returns the arm to its original position to engage the pawl with the next tooth of the ratchet.

The delivery rolls which are driven at a speed somewhat in excess of that of the feed in rolls separates the severed pieces so that when the rear end of a piece passes the flag 171 the switch 156 is opened and the magnet 163 is energized to withdraw the pin 162 from the cam portion of the groove 161 and permit the contact member 154 to engage the contact member 153. At the same time, the magnet 165 is de-energized and the switch 156 is opened so that engagement of the contacts 153 and 154 does not start the motor. When the rear end of the severed piece passes the flag 172, the switch 158 is opened so that the motor circuit switches are then all in starting position ready to be again actuated in the sequence above described by the passage of the strip beneath the flags. As will readily be apparent, adjustment of the flag 172 along the trough toward and from the flag 171 will vary the time interval between successive actuations of the motor and the number of reciprocations of the shear head between successive actuations of the knives may thus be varied to cut the strip into longer or shorter pieces, as may be desired.

When the machine is started in operation, the distance bars 101 and 104 should be in vertical position. The shear head reciprocating mechanism and the cam roll driving mechanism should be started into operation and operated until the circumferential speed of the rolls is equal to the speed of the moving steel to be cut, and the reciprocating motion of the shear head is such that it is moving at a linear speed nearly equal to the linear speed of the steel strip to be cut. The steel will then be fed into the machine, and after the first end of the steel has passed the desired distance through the shear head, the distance bars 101 and 104 are turned to horizontal position, either by means of the hand lever or by means of the motor. The shear head 32 on reaching its extreme position on the incoming side will push the cross head 83 the necessary distance to bring the roll actuating toggles in a straight line position, lowering the top roll 7 and raising the lower roll 8 so that when the shear head passes between the rolls during its forward stroke the shear knives 45 are deflected by the cam rolls a sufficient distance to cause the edges of the knives to pass one another slightly and cut the strip steel. Engagement of the shear head 90 returns the cam rolls to their inoperative position and also shifts the distance bars 101 and 104 to vertical position so that the shear head may reciprocate until the distance bars are moved again to horizontal position either by manual means or by the automatically controlled actuator whereupon another cut will be made.

In reciprocating machines, considerable power is required to overcome the inertia of the reciprocating parts in reversing their direction of movement, and this additional power required at the ends of the stroke puts considerable strain upon the operating mechanism. The cushioning cylinders provided herein, to a large extent, relieve the operating mechanism of this strain so that a less powerful motor is required for operating the reciprocating parts. The power-driven cam rolls also assist the shear head reciprocating mechanism in forcing the shear head through the space between the rolls so that excessive resistance of movement to the shear head in passing between the cams is avoided.

Having thus described my invention, I claim:

1. A shear comprising a frame, means for feeding a strip endwise through the frame, a head having an opening through which the strip passes, means supporting said head for movement in the frame lengthwise of the strip, means for reciprocating said head, a cutter mounted in the head for movement transversely of the strip to sever the same, a cutter actuating member movably mounted on the frame, and means operated by said head in its movements for shifting said member into and out of the path of movement of said cutter.

2. A shear comprising a frame, means for feeding a strip endwise through the frame, a head having an opening through which the strip passes, means supporting said head for movement in the frame lengthwise of the strip, means for reciprocating said head, a cutter mounted in the head for movement transversely of the strip to sever the same, a cutter actuating member movably mounted on the frame, and actuating means for said member having a part with which the head engages at one end of its stroke for shifting said member to cutter engaging position, and a part with which the head engages at the opposite end of its stroke for shifting said member out of cutter engaging position.

3. A shear comprising a frame, means for feeding a strip endwise through the frame, a head having an opening through which the strip passes, means supporting said head for movement in the frame lengthwise of the strip, means for reciprocating said head, a cutter mounted in the head for movement transversely of the strip to sever the same, a cutter actuating roll mounted on the frame for movement transversely of the strip into and out of the path of movement of said cutter, and means operated by said head in its movements for shifting said roll into and out of the path of movement of said cutter.

4. A shear comprising a frame, means for feeding a strip endwise through the frame, a head having an opening through which the strip passes, means supporting said head for movement in the frame lengthwise of the strip, means for reciprocating said head, a cutter mounted in the head for movement transversely of the strip to sever the same, a cutter actuating roll movably mounted on the frame, and actuating means for said roll having a part adjacent the incoming side of the frame with which the head engages at one end of its stroke for shifting the roll to cutter engaging position, and a part adjacent the outgoing side of the frame with which the head engages at the opposite end of its stroke for shifting the roll out of cutter engaging position.

5. A strip cutting machine comprising a supporting frame, a horizontally movable shear head on said frame, said head having upper and lower knives mounted for vertical movement therein, means for reciprocating said head, means for feeding a strip through said head between said knives, upper and lower knife actuating members mounted for vertical movement to and from the line of movement of said head, and means for simultaneously moving said members into and out of the paths of movement of said knives.

6. A strip cutting machine comprising a supporting frame, a horizontally movable shear head on said frame, said head having upper and lower knives mounted for vertical movement therein, means for reciprocating said head, means for feeding a strip through said head between said knives, upper and lower rolls mounted for vertical movement to and from the line of movement of said head, means for simultaneously moving said rolls into and out of the paths of movement of said knives, and means for driving said rolls.

7. A strip cutting machine comprising a supporting frame, a horizontally movable shear head on said frame, said head having upper and lower knives mounted for vertical movement therein, means for reciprocating said head, means for feeding a strip through said head between said knives, upper and lower knife actuating members mounted for vertical movement to and from the line of movement of said head, and means actuated by the shear head in its movements for moving said members into and out of the paths of movement of said knives.

8. A strip cutting machine comprising a supporting frame, a horizontally movable shear head on said frame, said head having upper and lower knives mounted for vertical movement therein, means for reciprocating said head, means for feeding a strip through said head between said knives, upper and lower knife actuating members mounted for vertical movement to and from the line of movement of said head, means including a movable member at the incoming side of the frame in the path of movement of said shear head for shifting the said members to knife engaging positions, and means including a movable part at the outgoing side of the frame in the path of movement of the shear head for shifting the said members out of knife engaging positions.

9. A strip cutting machine comprising a supporting frame, a horizontally movable shear head on said frame, said head having upper and lower knives mounted for vertical movement therein, means for reciprocating said head, means for feeding a strip through said head between said knives, upper and lower rolls mounted for vertical movement to and from the line of movement of said head, means including a movable member at the incoming side of the frame in the path of movement of said shear head for shifting the rolls to knife engaging positions, means including a movable part at the outgoing side of the frame in the path of movement of the shear head for shifting the rolls out of knife engaging positions, and means for driving said rolls in directions such that the peripheral portions thereof adjacent the strip move in the same direction as the strip.

10. A strip cutting machine comprising a supporting frame, a horizontally movable shear head on said frame, said head having upper and lower knives mounted for vertical movement therein, means for reciprocating said head, means for feeding a strip through said head between said knives, upper and lower knife actuating members mounted for vertical movement to and from the line of movement of said head, means actuated by the shear head in its movements for moving said members into and out of the paths of movement of said knives, and means for rendering said last mentioned means inoperative.

11. A strip cutting machine comprising a supporting frame, a horizontally movable shear head on said frame, said head having upper and lower knives mounted for vertical movement therein, means for reciprocating said head, means for feeding a strip through said head between said knives, upper and lower knife actuating members mounted for vertical movement to and from the line of movement of said head, a movable cross head at the incoming side of the frame, having an abutment member adjustable from a position clear of the shear head in its movements to a position overlapping the stroke of the shear head, means for shifting said member, means connecting said cross head to said members for shifting the same to knife engaging position, a movable cross head at the outgoing side of the frame in the path of travel of said shear head, and means connecting said cross head to said members for shifting the same out of knife engaging positions.

12. A strip cutting machine comprising a supporting frame, a horizontally movable shear head on said frame, said head having upper and lower knives mounted for vartical movement therein, means for reciprocating said head, means for feeding a strip through said head between said knives, upper and lower knife actuating members mounted for vertical movement to and from the line of movement of said head, a movable cross head at the incoming side of the frame having an abutment member adjustable from a position clear of the shear head in its movements to a position overlapping the stroke of the shear head, means for shifting said abutment member, means connecting said cross head to said knife actuating members for shifting the same to knife engaging position, a movable cross head at the outgoing side of the frame in the path of travel of said shear head, means connecting said cross head to said knife actuating members for shifting the same out of knife engaging positions, and means for automatically shifting said abutment member to inoperative position when said knife actuating members are moved out of knife engaging position.

13. A strip cutting machine comprising a supporting frame, a horizontally movable shear head on said frame, said head having upper and lower knives mounted for vertical movement therein, means for reciprocating said head, means for feeding a strip through said head between said knives, upper and lower knife actuating members mounted for vertical movement to and from the line of movement of said head, toggles connected to said members for shifting the same toward and from the path of movement of said shear head, and means operated by said head in its movements for simultaneously actuating said toggles.

14. A strip cutting machine comprising a supporting frame, a horizontally movable shear head on said frame, said head having upper and lower knives mounted for vertical movement therein, means for reciprocating said head, means for feeding a strip through said head between said knives, upper and lower knife actuating members mounted for vertical movement to and from the line of movement of said head, counterbalancing means connected to said members, toggles connected to said members for shifting the same into and out of knife engaging positions, and means operated by said head in its movements for simultaneously actuating said toggles.

15. A flying shear comprising a reciprocating shear head having movable cutting means thereon, means for feeding a strip to be cut through said head, means for actuating said cutting means to sever the strip while said head is moving in the same direction as the strip, and cushioning means with which said head engages at the ends of its stroke.

16. A flying shear comprising a reciprocating shear head having movable cutting means thereon, means for feeding a strip to be cut through said head, means for actuating said cutting means to sever the strip while said head is moving in the same direction as the strip, movable members in the path of movement of said head and positioned to be engaged by the head at the ends of its stroke, and pneumatic cushioning cylinders having pistons connected to said members.

17. A flying shear comprising a reciprocating shear head having movable cutting means thereon, means for feeding a strip to be cut through said head, means for actuating said cutting means to sever the strip while said head is moving in the same direction as the strip, a pair of levers positioned upon opposite sides of the head in the path of movement thereof, a link connecting said levers and pneumatic cushioning cylinders having pistons connected to said levers.

18. A strip cutting machine comprising a frame, means for feeding a strip through the frame, a pair of oppositely movable shear knives, means for supporting the knives upon opposite sides of the strip and for moving the knives with said strip, and a pair of opposed knife operating members on opposite sides of the strip in the paths of movement of said knives for moving said knives toward each other to sever the strip.

19. A strip cutting machine comprising a frame, means for feeding a strip through the frame, a pair of oppositely movable shear knives, means for supporting the knives upon opposite sides of the strip and for moving the knives with said strip, a pair of opposed knife operating rolls on opposite sides of the strip in the paths of movement of said knives for moving said knives toward each other to sever the strip, and means for rotating said rolls in directions such that the peripheral portions thereof adjacent the strip move in the direction of movement of the strip and at a speed substantially equal to the speed of movement of the strip.

20. A shear comprising a frame, means for feeding a strip endwise through the frame, a head having an opening through which the strip passes, a cutter mounted in the head for movement transversely of the strip to sever the same, means for reciprocating the head, means for actuating said cutter, and means for operating said actuating means including a pair of movable controlling members mounted at the delivery side of the machine in the path of the strip material delivered from the machine, one of said controlling members being adjustable toward and from the other to vary the time interval between actuations of the cutter.

In testimony whereof, I hereunto affix my signature.

WILLIAM T. MARTERSTECK.